United States Patent
Ibenthal

Patent Number: 5,974,188
Date of Patent: Oct. 26, 1999

[54] METHOD OF FRACTAL IMAGE CODING AND ARRANGEMENT OF PERFORMING THE METHOD

[75] Inventor: Achim Ibenthal, Elmshorn, Germany

[73] Assignee: U.S. Philips Corporation, New York, N.Y.

[21] Appl. No.: 08/960,392

[22] Filed: Oct. 29, 1997

[30] Foreign Application Priority Data

Nov. 20, 1996 [DE] Germany .......................... 196 48 016

[51] Int. Cl.$^6$ ............................ G06K 9/36; G06K 9/46
[52] U.S. Cl. ........................ 382/249; 382/216; 382/278; 382/280
[58] Field of Search ..................... 382/232, 239, 382/248, 249, 278, 280, 209, 216, 218; 345/436; 348/395, 403, 405; 341/51; 364/715.02, 725.01, 726.01, 726.02, 728.03, 728.05

[56] References Cited

U.S. PATENT DOCUMENTS

| | | | |
|---|---|---|---|
| 4,817,176 | 3/1989 | Marshall et al. .......................... | 382/280 |
| 5,497,435 | 3/1996 | Berger ..................................... | 382/249 |
| 5,768,437 | 6/1998 | Monro et al. ............................ | 382/249 |
| 5,878,157 | 3/1999 | Mukohzaka .............................. | 382/124 |

OTHER PUBLICATIONS

Fisher, Fractal Image Compression, 1994, pp. 10–14, 92–92–96.
Saupe, A New View of Fractal Image Compression as Convolution Transform Coding, Jul. 1996, pp. 193–195, IEEE.

*Primary Examiner*—Amelia Au
*Assistant Examiner*—Timothy M. Johnson
*Attorney, Agent, or Firm*—Laurie E. Gathman

[57] ABSTRACT

Fractal image coding of single images or image sequences is described, which yields an improvement of the encoding result as well as a reduction of computations, wherein each image is divided into range blocks which do not overlap and jointly comprise the complete image contents, range regions are generated, each comprising a range block which is smaller than the range region concerned, and the rest of the range region is filled up with a predetermined signal value, domain regions are generated having the same size as the range regions and comprise parts of the image contents, preferably also in a transformed form, the image data of the range regions and the domain regions are subjected to a Fourier transform, a conjugate-complex signal is formed from one of the two transformed signals and multiplied by the other signal, this product is normalized at a predetermined amplitude, the normalized signal is subjected to an inverse Fourier transform, for each range region, the maximum value of this retransformed signal is determined, indicating, within a domain region, the position of that domain block whose image contents best approximate the image contents of the range block, for these domain blocks, those scaling and offset factors are determined which, when used for the domain blocks found, enable these domain blocks to be imaged on the range blocks with the smallest deviation, and the encoded signal comprises the addresses of these domain blocks, whose image contents best approximate the range blocks, the scaling and offset factors.

9 Claims, 3 Drawing Sheets

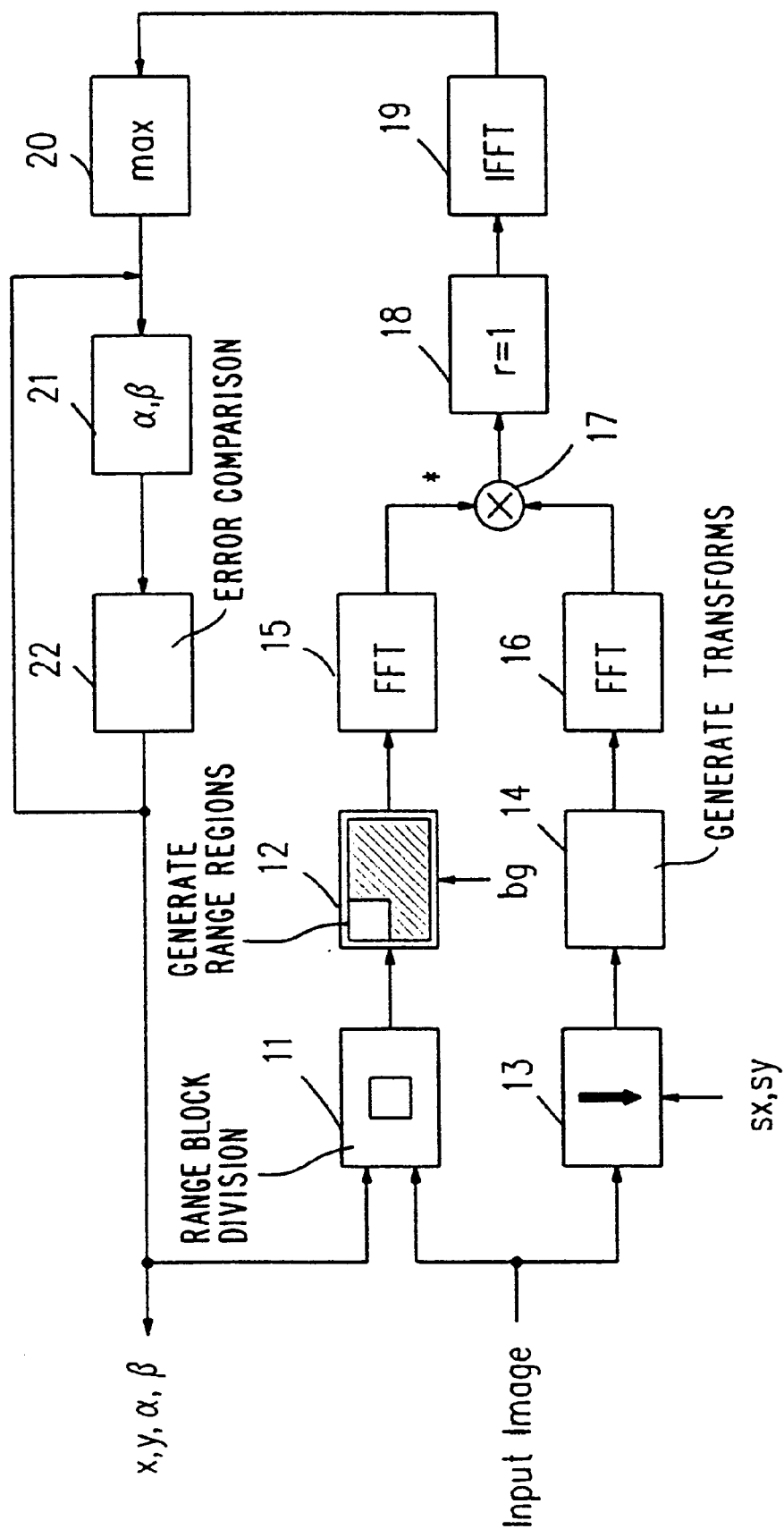

METHOD OF FRACTAL IMAGE CODING AND ARRANGEMENT OF PERFORMING THE METHOD

BACKGROUND OF THE INVENTION

The invention relates to a method of fractal image coding of single images or image sequences. The invention also relates to an arrangement for performing the method.

In known arrangements or methods for fractal image coding, the image is divided into range blocks. These blocks have mutually equal sizes, do not overlap and cover the complete image contents. Moreover, domain blocks are generated which comprise image data about a given image area. Since the domain blocks may overlap, the number of domain blocks is a multiple of the number of range blocks. Such a method is known from, for example the article "Fractal Image Coding and Magnification using Invariant Moments", by D. Götting, A. Ibenthal and R.-R. Grigat, in Nato Advance Study Institute on Fractal Image Encoding and Analysis, Trondheim, Norway, 1995.

A domain block is searched for each range block, which domain block can be imaged on the range block with a minimal deviation by means of an (affine) transformation.

The problem with coding is that, due to the number of large domain blocks, the search for the most favorable domain block for each range block requires a considerably elaborate computation. Moreover, due to the fixed division of the image, this known method is inflexible, particularly in the domain blocks.

SUMMARY OF THE INVENTION

It is an object of the invention to improve this method of fractal image coding to such an extent that the elaborate computation for finding suitable domain blocks is simplified and the coding result is improved.

According to the invention, this object is solved by a method of fractal image coding, in which

- each image is divided into range blocks which do not overlap and jointly comprise the complete image contents,
- range regions are generated, each comprising a range block which is smaller than the range region concerned, and the rest of the range region is filled up with a predetermined signal value,
- domain regions are generated which have the same size as the range regions and comprise at least parts of the image contents, preferably also in a transformed form,
- the image data of the range regions and the domain regions are subjected to a Fourier transform,
- a conjugate-complex signal is formed from one of the two transformed signals and multiplied by the other signal,
- this product is normalized at a predetermined amplitude,
- the normalized signal is subjected to an inverse Fourier transform,
- for each range region, the maximum value of this retransformed signal is determined, indicating, within a domain region, the position of that domain block whose image contents best approximate the image contents of the range block,
- for these domain blocks, those scaling and offset factors are determined which, when used for the domain blocks found, enable these domain blocks to be imaged on the range blocks with the smallest deviation, and
- the encoded signal comprises the addresses of these domain blocks, whose image contents best approximate the range blocks, the scaling and offset factors and possibly the transform functions used for generating the domain regions.

Each image to be encoded is divided into range blocks. These blocks do not overlap, but jointly represent the complete image contents. Range regions are generated from the range blocks. Each range region comprises a range block which is smaller than the range region itself. The rest of each range region is filled up with a predetermined signal value which does not convey any information.

Moreover, domain regions are generated which have the same size as the range regions. Each domain region comprises at least parts of the image contents, preferably also in a transformed form. The complete domain regions are filled up by contents of the image, possibly also in a transformed form.

The data of a range region and those domain regions in which similarities are to be searched are subjected to a Fourier transform. The two transformed signals, one of which is converted into its conjugate-complex signal, are multiplied by each other and subsequently normalized. After conversion by means of the Fourier transform, the signals have now been converted from the local range to the frequency range. Due to the normalization, the signal has an amplitude of 1. The information is now still only present in the phase of this signal in the frequency range. This signal is retransformed, i.e. transformed to the local range again. This retransformed signal now conveys the amplitude information indicating which range within a domain region is imageable on the range region with the smallest deviation and hence on the range block contained therein. This range of a domain region will hereinafter be referred to as domain block. By evaluating the maximum value of the retransformed signal, it is thus determined which domain block in the domain regions in which a search was performed has the greatest similarity with a range block whose range region was compared with the domain regions. In contrast to the prior-art method, the position of the domain block is arbitrary in this case. It is true that the block has the same format as the range block but there is no fixed division of the image, as is the case in the prior-art method. The block itself may have any arbitrary position within, the domain region. In contrast, each time just one block position is processed in the prior-art method.

For the domain block found, those scaling and offset factors are determined which, when used for the domain block, enable this domain block to be imaged on the range block of the range region with the smallest deviation.

The encoded signal comprises the addresses of the domain blocks found, whose image contents best approximate the range blocks. Furthermore, the scaling and offset factors are transmitted as well as the transform functions which are possibly used when imaging the domain regions on the range regions.

The main advantage of the method according to the invention is that a search for a suitable domain block is not performed in the local range/time range, as in the prior-art method, but in the frequency range. After the Fourier transform, the signals in the frequency range are multiplied and normalized. This normalized signal is retransformed. By simple maximum evaluation of the retransformed signal, the optimum position of a domain block within the domain region can be found. The computation used for this procedure is clearly less elaborate than in the prior-art method in which each range block must be compared with each domain block in the local range of the image data. Moreover, the method according to the invention has the advantage that the coding result is improved. This can be achieved in that the domain regions are not fixed as far as their block division is concerned. This means that the domain blocks have a given size but their position is arbitrary and not bound to a given block raster.

In accordance with an embodiment of the invention, the coding result may be further improved in that a post-matching operation is performed for the range blocks, in which method those ranges are determined which are approximated with a predetermined maximal error by the domain block found as being the most similar, while the other ranges of each range block are subdivided and domain blocks being more similar are searched for these blocks by means of the method.

In this way, the domain blocks found can be subdivided once again. Within a domain block found for a range block, only those ranges are used for coding which fall below the predetermined error value. The other ranges of the range blocks may be used again in the method, i.e. they are put in the range regions again and compared with domain regions. In this way, an even more favorable coding may be found for these blocks.

As a result, this means that the domain blocks may have different sizes and positions. A range block may be encoded by different domain blocks of different sizes and different positions. Generally, the contours found for the range blocks and domain blocks are variable so that range regions of any arbitrary form can be encoded. The data can thus be encoded even better.

In accordance with a further embodiment of the invention, the domain regions represent the complete image contents of an image, particularly at least partly also in a transformed form and preferably in a rotated and/or mirrored form.

Since, in principle, the domain regions may have any arbitrary size, they may be formed in such a way that they represent the complete contents of an image. Moreover, they may also comprise these image contents partially in a transformed form, for example in a rotated or a mirrored form. In this way, a relatively large domain region is produced, whose size is to be matched with the size of the range region. This is no problem in the method according to the invention, because the range block within the range region remains equally large, but the rest of the range region is filled up with the predetermined signal value.

This provides the considerable advantage that the complete contents of the image, preferably also in a transformed form, can be compared with the range region in a search operation. Thus, for a range region and hence for the range block contained in this region, that domain block which is imageable on the range block with the, smallest deviation can be found in the complete image in a search operation. In this case, the domain region may comprise the original image partially also in a transformed form so that further individual searches are not necessary. Here, the advantage of the invention becomes particularly manifest in that the optimum domain block can be found by a simple maximum evaluation of the retransformed signal.

For optimum search results, it is advantageous when the range block is embedded in each range region in such a way that, in accordance with a further embodiment of the invention, within each range region, transition zones between the range block and the other range region are provided, in which a smooth transition between the image contents of the range block and the contents of the rest of the region is obtained via a predetermined number of pixels.

Due to this "smooth" transition between the range block and the rest of the range region, local frequencies are attenuated which might be interpreted as "useful frequencies" of the range block in the search for the domain region.

In accordance with a further embodiment of the invention, the values of these transition zones and the signal value of the rest of the range region may be such that the transition zones have a width of approximately four to six pixels and the signal value of the rest of the range region outside the range block is approximately one fourth to one half of the signal value which is maximally possible for the range block.

The method described above may be used for intraframe coding of single images in such a way that the range regions and domain regions are generated from one image. An intraframe coding of consecutive images, thus of image sequences, is advantageously performed in that, in accordance with a further embodiment of the invention, for coding image sequences, the image contents of at least some of the range regions and/or at least some of the domain regions stem from different images of an image sequence.

These and other aspects of the invention are apparent from and will be elucidated with reference to the embodiments described hereinafter.

BRIEF DESCRIPTION OF THE DRAWINGS

In the drawings:

FIG. 5 is a block diagram of an encoder in accordance with the invention.

DETAILED DESCRIPTION OF THE PREFERRED EMBODIMENTS

Figure 1:
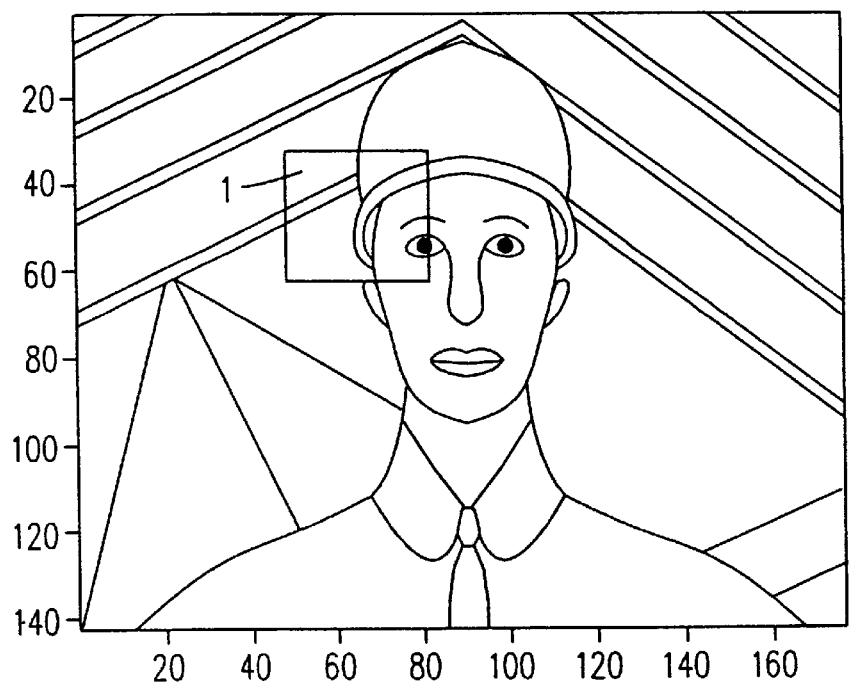
FIG. 1 shows an image to be encoded, as well as a range block marked in this image.

FIG. 1 shows an image to be encoded. The image shows a worker in front of a building.

In this embodiment, the image shown in FIG. 1 has 176 pixels in the horizontal direction and 144 pixels in the vertical direction. The image car be completely encoded by means of fractal image coding. To this end, it is divided into range blocks. Each range block may comprise, for example 32×32 pixels. All range blocks combined represent the complete contents of the image but do not overlap each other.

The region of the image which represents the image contents of the range block with the smallest deviation in either a direct or a transformed form is to be searched for each range block.

In the prior-art method, the division of the domain blocks was fixed, i.e. the image was divided into domain blocks whose position and size were fixed.

With reference to the example shown in the drawing, it will hereinafter be explained that the domain blocks searched by means of the method according to the invention have a free position and division and that the method according to the invention leads to a faster search process and an improvement of the encoding result.

FIG. 1 shows a range block 1 as an example. This range block comprises parts of the face and helmet of the worker as well as parts of the building in the background.

Similarly as for all other range blocks of the image, which are not shown in FIG. 1, that domain block of the image must be searched for this range block 1 which represents the image contents of the range block 1, possibly in a transformed form, with the smallest deviation.

In the method according to the invention, this search is not performed in single domain blocks but in domain regions. These domain regions may comprise parts of the image as shown in FIG. 1, but preferably they comprise the complete image in a reduced form.

Figure 2:
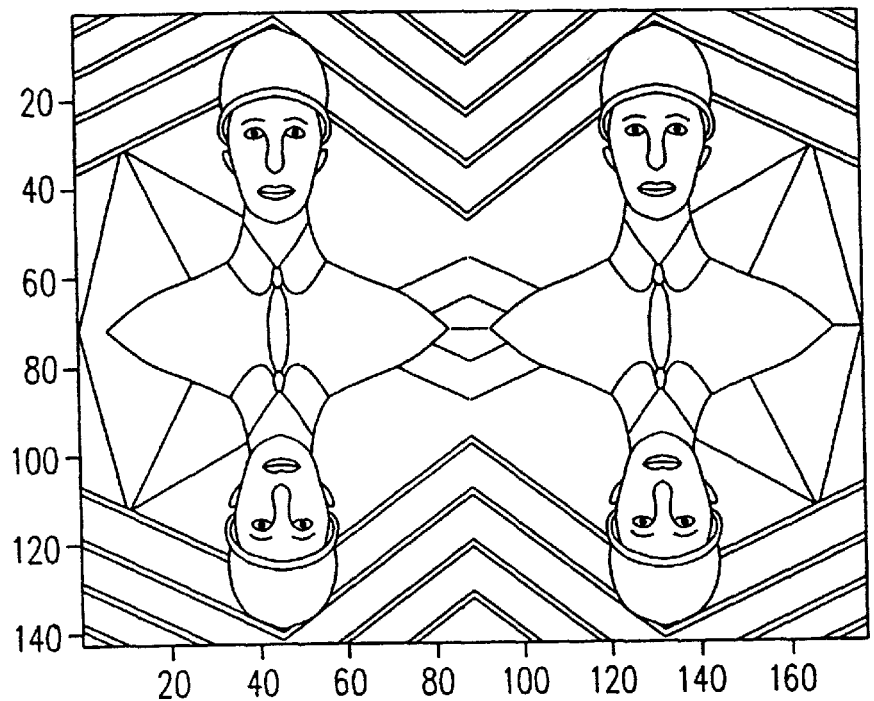
FIG. 2 shows a domain region generated from the image shown in FIG. 1.

This is shown by way of example in FIG. 2. The domain region in FIG. 2 shows the image of FIG. 1 in the upper left quarter in a form reduced by a factor of 2. Moreover, it comprises three mirror images of the same image. The domain region shown in FIG. 2 thus comprises the complete image in a reduced form with the original image contents, as well as three mirrored variants. In the method according to the invention, that domain block which represents the range block 1 of FIG. 1 with the smallest deviation is now to be searched within the domain region shown in FIG. 2.

The division of the domain blocks within the domain region of FIG. 2 is arbitrary. There are no fixed block rasters or the like.

Since the domain region of FIG. 2 is clearly larger than the range block 1 of the image 1, which comprises only a part of the image, a range region is generated in the method according to the invention.

Figure 3:
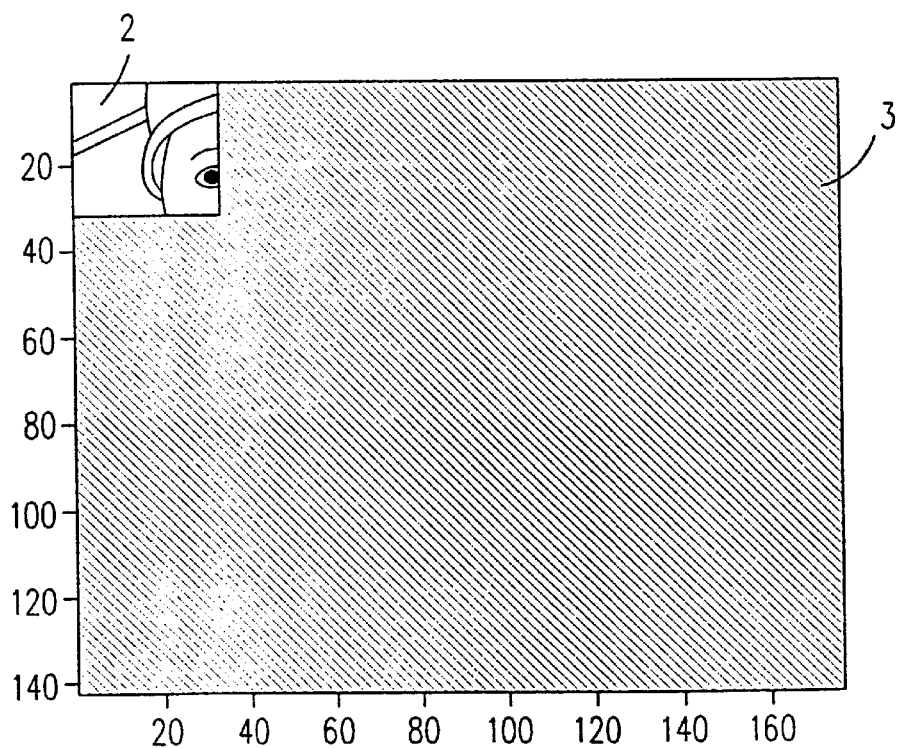
FIG. 3 shows a range region in which the range block shown in FIG. 1 is comprised.

This is shown by way of example in FIG. 3. FIG. 3 shows a section 2 comprising the range block 1 of FIG. 1. Similarly as the domain region of FIG. 2, the range region of FIG. 3 has 176×144 pixels. To obtain the same size of the range region of FIG. 3 and the domain region of FIG. 2, the other area 3 of the range region of FIG. 3 is filled up with a fixed signal value, preferably a grey value.

The same size is thus obtained for the regions.

The search process is effected in such a way that the data signals of the range region of FIG. 3 and the domain region of FIG. 2 are subjected to a Fourier transform and subsequently one of the signals is transformed into its conjugate-complex signal, whereafter both signals are multiplied. The signals are normalized still in their frequency range, i.e. with reference to an amplitude 1. After the retransform, the position of that domain block which has the greatest similarity with the range block 2 of the range region 3 can be determined by means of a maximum evaluation of the retransformed signal within the domain region of FIG. 2 and by evaluating the position of this maximum value.

This method requires relatively easy computations and has the additional advantage that the domain blocks have a free position so that an improved coding result is achieved.

FIG. 5 is a block diagram of an encoder operating in accordance with the inventive method.

The encoder receives an input image at the input, for example the image shown in FIG. 1. The corresponding image signal is denoted as "Input Image" in FIG. 5.

Means 11 for range block selection and division of the image into range blocks receive the input image. The means 11 select, for example the range block 1 of FIG. 1. The output signal is applied to means 12 for generating the range regions. These means 12 generate a range region, for example the region shown in FIG. 3. To this end, not only the range block 2 of FIG. 3 is applied to the range region but a grey value is also applied to the other areas 3. The output signal of the means 12 yields a range region, for example the region shown in FIG. 3.

The input signal "Input Image" is further applied to means 13 for reducing the image contents. They generate, for example the upper left quarter of the domain region of FIG. 2.

The output signal of the means 13 is applied to means 14 for generating transforms. The means 14 generate, for example the other three blocks of the domain region of FIG. 2.

Both the output signals of the means 12 and those of the means 14 are applied to means 15 and 16, respectively, for Fourier transform. The output signals of the means 15 and 16 are applied to a multiplier 17. However, one of the signals of the means 15 or 16 is converted in advance into its conjugate-complex signal. This is preferably done with the output signal of the means 15 because then the circuit arrangement shown in FIG. 5 indicates the vectors for determining the domain blocks with the correct sign.

The output signal of the multiplier 17 is applied to means 18 for normalization. Here, the amplitude is normalized at 1 so that the signal no longer comprises any amplitude information. This has the advantage that amplitude variations of the image contents do not play any role when comparing the domain regions with the range regions. The normalized signal is subsequently applied to means 19 for inverse Fourier transform which retransform the signal to the local range again. The output signal of the means 19 is applied to means 20 for maximum evaluation. This maximum evaluation indicates that position of the domain block within the domain region whose image contents best approximate the range block of the range region. For the purpose of coding, the scaling factor $\alpha$ and the offset factor $\beta$ are determined, at which factors, when they are used, the similarity between these two blocks is greatest. This is effected by scaling means 20.

In the simplest case, a coding of a range block via a domain block has then already been performed successfully. This method has the advantage that it requires very little computation, particularly by virtue of the Fourier transform and the subsequent inverse transform after multiplication.

The coding result may even be further improved. To this end, the data of the domain block found are compared with the data of the range block found. The resultant error deviation may be utilized for further improving the coding result.

Figure 4:
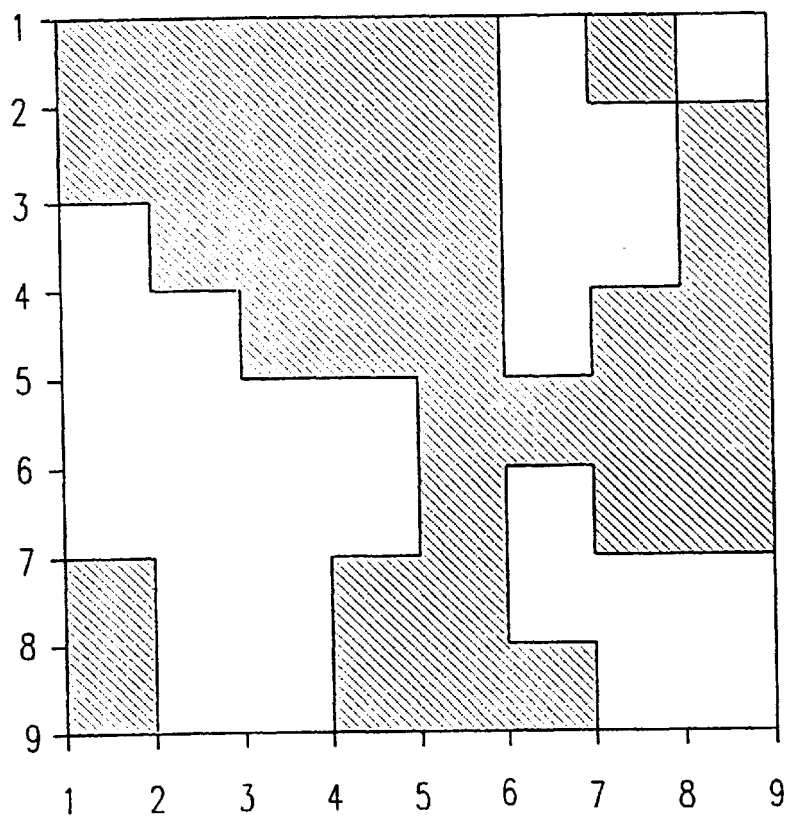
FIG. 4 shows the result of a comparison of a domain block found in the domain region shown in FIG. 2 with the range block shown in FIG. 1.

FIG. 4 shows by way of example such an error deviation for a range block and the domain block found. The error is compared with a predetermined nominal error value. Those areas of the range block which can be imaged via the domain block with an error which is smaller than the predetermined error value are shown as bright parts in FIG. 4. The other areas, which are imaged with a larger error, are shaded.

In an advantageous embodiment of the invention, it is possible to image the shaded areas of the range block of FIG. 4, not via the domain block found but rather via a renewed search for domain blocks in these areas which are better suitable, i.e. allow imaging with a smaller error deviation. To this end, FIG. 5 shows means 22 for post-matching. The means 22 carry out the error comparison whose result is diagrammatically shown in FIG. 4 and supply, from the output, the data of those sub-areas of the range blocks which are to be encoded again. The corresponding data are applied to the means 11 for range block division and encoded again by means of the method. However, it is checked in advance whether the range regions which have not been adequately approximated (for example, the shaded areas in FIG. 4) can be approximated with other factors $\alpha$, $\beta$.

The circuit arrangement shown in FIG. 5 supplies, from the output, the addresses X and Y of those domain blocks which are found as being the most similar for the range blocks. Moreover, the arrangement supplies the scaling factors α and offset factors β used for these domain blocks.

The method according to the invention is thus carried out with a small number of computations and has a high flexibility so that both the encoding speed and the encoding result can be improved. An even greater encoding improvement can be achieved by means of the post-matching step.

I claim:

1. A method of fractal image coding of single images or image sequences, in which method each image is divided into range blocks which do not overlap and jointly comprise the complete image contents, range regions are generated, each comprising a range block which is smaller than the range region concerned, and the rest of the range region is filled up with a predetermined signal value, domain regions are generated which have the same size as the range regions and comprise at least parts of the image contents, preferably also in a transformed form, the image data of the range regions and the domain regions are subjected to a Fourier transform, a conjugate-complex signal is formed from one of the two transformed signals and multiplied by the other signal, this product is normalized at a predetermined amplitude, the normalized signal is subjected to an inverse Fourier transform, for each range region, the maximum value of this retransformed signal is determined, indicating, within a domain region, the position of that domain block whose image contents best approximate the image contents of the range block, for these domain blocks, scaling and offset factors are determined which, when used for the domain blocks found, enable these domain blocks to be imaged on the range blocks with the smallest deviation, and the encoded signal comprises the addresses of these domain blocks, whose image contents best approximate the range blocks and, the scaling and offset factors.

2. A method as claimed in claim 1, characterized in that a post-matching operation is performed for the range blocks, in which method those ranges are determined which are approximated with a predetermined maximal error by the domain block found as being the most similar, while the other ranges of each range block are subdivided and domain blocks being more similar are searched for these blocks by means of the method.

3. A method as claimed in claim 1, characterized in that the domain regions comprise the original image contents in a reduced form.

4. A method as claimed in claim 1, characterized in that the domain regions represent the complete image contents of an image, particularly at least partly also in a transformed form and preferably in a rotated and/or mirrored form.

5. A method as claimed claim 1, characterized in that, within each range region, transition zones between the range block and the other range region are provided, in which a smooth transition between the image contents of the range block and the contents of the rest of the region is obtained via a predetermined number of pixels.

6. A method as claimed in claim 5, characterized in that the transition zones have a width of approximately four to six pixels and the signal value of the rest of the range region outside the range block is approximately one fourth to one half of the signal value which is maximally possible for the range block.

7. A method as claimed claim 1, characterized in that, for coding image sequences, the image contents of at least some of the range regions and/or at least some of the domain regions stem from different images of an image sequence.

8. An encoder for performing the method as claimed in claim 1, characterized in that the encoder comprises means (11) for selecting range blocks and for dividing an image applied to the arrangement into range blocks, means (12) for generating the range regions from the range blocks, means (13) for reducing the image contents, which means receive the values of the image and whose output signals are applied to means (14) for generating transforms, which means supply the domain regions at the output, means (15, 16) for Fourier transform, which means receive the ,signals of the range regions and the domain regions, transform both signals and convert one of the transformed signals into a conjugate-complex signal, a multiplier (17) which multiplies the output signals of the means for Fourier transform and whose output signal is applied to means (18) for normalizing this signal at a predetermined signal value, means (19) for inverse Fourier transform, which means receive the normalized signal and have their output signal applied to means (20) for maximum evaluation whose output signal marks the maximum of its input signal and thus indicates that domain region for each range region which was found as being the most similar to this region, and scaling means (21) indicating, for this domain region, those scaling and offset factors which, when used, enable the domain region found to be imaged on the range region with the minimal deviation and to be transmitted together with the address of the range region.

9. An encoder as claimed in claim 8, characterized in that the scaling means (21) precede post-matching means (22) which determine those ranges for the range regions approximated with a predetermined maximal error by the domain region found as being the most similar region, which means subdivide the other ranges of each range region and apply the addresses of these ranges to the means for dividing an image into range blocks.

* * * * *